(12) United States Patent
Ford et al.

(10) Patent No.: US 8,898,520 B1
(45) Date of Patent: Nov. 25, 2014

(54) METHOD OF ASSESSING RESTART APPROACH TO MINIMIZE RECOVERY TIME

(75) Inventors: Terriss L. Ford, Overland Park, KS (US); Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 297 days.

(21) Appl. No.: 13/451,281

(22) Filed: Apr. 19, 2012

(51) Int. Cl.
*G06F 11/00* (2006.01)

(52) U.S. Cl.
USPC .......................................................... 714/15

(58) Field of Classification Search
CPC ............ G06F 11/1471; G06F 11/1438; G06F 11/1469
USPC .......................................................... 714/15
See application file for complete search history.

(56) References Cited

U.S. PATENT DOCUMENTS

| | | | | |
|---|---|---|---|---|
| 6,353,834 | B1 * | 3/2002 | Wong et al. ...................... 714/15 |
| 6,434,605 | B1 * | 8/2002 | Faulkner et al. .............. 709/213 |
| 6,754,842 | B2 * | 6/2004 | Kettley et al. ..................... 714/2 |
| 7,107,293 | B2 * | 9/2006 | Booz et al. ..................... 707/686 |
| 8,082,307 | B2 * | 12/2011 | Wallis et al. ................... 709/206 |
| 8,639,965 | B1 * | 1/2014 | Anugu et al. ................... 714/4.1 |
| 2004/0215998 | A1 * | 10/2004 | Buxton et al. ..................... 714/2 |
| 2006/0259545 | A1 * | 11/2006 | Garza et al. .................... 709/203 |
| 2013/0120449 | A1 * | 5/2013 | Ihara et al. ..................... 345/633 |

OTHER PUBLICATIONS

"Websphere MQ version 7.0—dspmq." IBM Information Center. retrieved from "http://publib.boulder.ibm.com/inforcenter/wmqv7/v7r0/topic/com.ibm.mq.amqzag.doc/fa15690_.htm" available as of Sep. 4, 2009.*
"Websphere MQ Version 6.0—Inquire Queue Status." IBM Information Center. retrieved from "http://publib.boulder.ibm.com/inforcenter/wmqv6/v6r0/topic/com.ibm.mq.csqzac.doc/pc13140_.htm" available as of Aug. 27, 2005.*
Kettley, P. "Websphere MQ for z/OS Restart and (Disaster) Recovery." SHARE Anaheim 2011. Anaheim, CA. Feb. 27-Mar. 4, 2011.*

* cited by examiner

*Primary Examiner* — Philip Guyton

(57) ABSTRACT

A computer implemented method is provided for message queue failure recovery. The method comprises detecting a failure in a message queue or a queue manager for the message queue, detecting a current status of each of the message queue and the queue manager, examining a maintained active log for the message queue and a message recovery log, examining usage of system resources associated with the message queue and the queue manager, and executing one of a plurality of failure recovery procedures based on the current status of the message queue and the queue manager, the active log, the message recovery log, and the usage of the system resources.

20 Claims, 5 Drawing Sheets

METHOD OF ASSESSING RESTART APPROACH TO MINIMIZE RECOVERY TIME

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large business enterprises typically include computer systems that may be monitored to analyze performance efficiencies, such as for system optimization or error detection purposes. Examples of such systems are mainframe and personal computer networks, which may include queues for handling message requests. Message queues typically receive, process, and forward requests for information and services. Message queuing is a method of application-to-application communication, such as communication between an application that services a user and an application that retrieves data from a database. Applications may communicate by writing and reading application-specific data, or messages, to and from queues, without having a dedicated synchronous link between the applications. Messaging means that applications communicate with each other by sending discrete amounts of data in messages to some intermediary, and not necessarily by calling each other directly. Queuing implies that applications communicate through queues, which removes the requirement for both the sending application and the receiving application to execute concurrently and/or synchronously. In other words, the sending and receiving of messages is asynchronous; and there is typically no time dependency between sending and receiving, except that which may be imposed by the applications themselves.

SUMMARY

In some embodiments, a system is provided for message queue failure recovery. The system includes a computer readable storage medium comprising a recovery management component stored as a set of computer instructions executable by a processor. The recovery management component detects a failure in a message queue or a queue manager for the message queue. The recovery management component also detects a current status of each of the message queue and the queue manager. Additionally, the recovery management component examines a maintained active log for the message queue and a message recovery log. Furthermore, the recovery management component executes one of a plurality of failure recovery procedures based on the current status of the message queue and the queue manager, the active log, and the message recovery log. The failure recovery procedures comprise a first procedure to restart the queue manager and reload one or more messages in the queue manager from a backup queue, a second procedure to shut down and restart a server that hosts the message queue and the queue manager, and a third procedure to shut down a server that hosts the message queue and the queue manager and signal a request for further investigation into the failure.

In some embodiments, a computer implemented method is provided for message queue failure recovery. A failure is detected in a message queue or a queue manager for the message queue. A current status of each of the message queue and the queue manager is detected. A maintained active log for the message queue and a message recovery log are examined. Usage of system resources associated with the message queue and the queue manager is also examined. One of a plurality of failure recovery procedures are executed based on the current status of the message queue and the queue manager, the active log, the message recovery log, and the current status of the system resources.

In some embodiments, a system is provided for message queue failure recovery. The system includes a computer readable storage medium comprising a recovery management component stored as a set of computer instructions executable by a processor. The recovery management component detects a failure in a message queue or a queue manager for the message queue. The recovery management component also detects a current status of each of the message queue and the queue manager. The recovery management component also examines a maintained active log for the message queue and a message recovery log. Additionally, the recovery management component examines status and log information for a plurality of other message queues and queue managers for the other message queues. Furthermore, the recovery management component executes one of a plurality of failure recovery procedures based on the current status of the message queue and the queue manager, the active log, and the message recovery log. Moreover, the recovery management component redistributes a plurality of messages previously assigned to the failed message queue or queue manager to the other message queues or the queue managers of the other message queues based on the status and log information for the message queues and queue managers for the other message queues.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
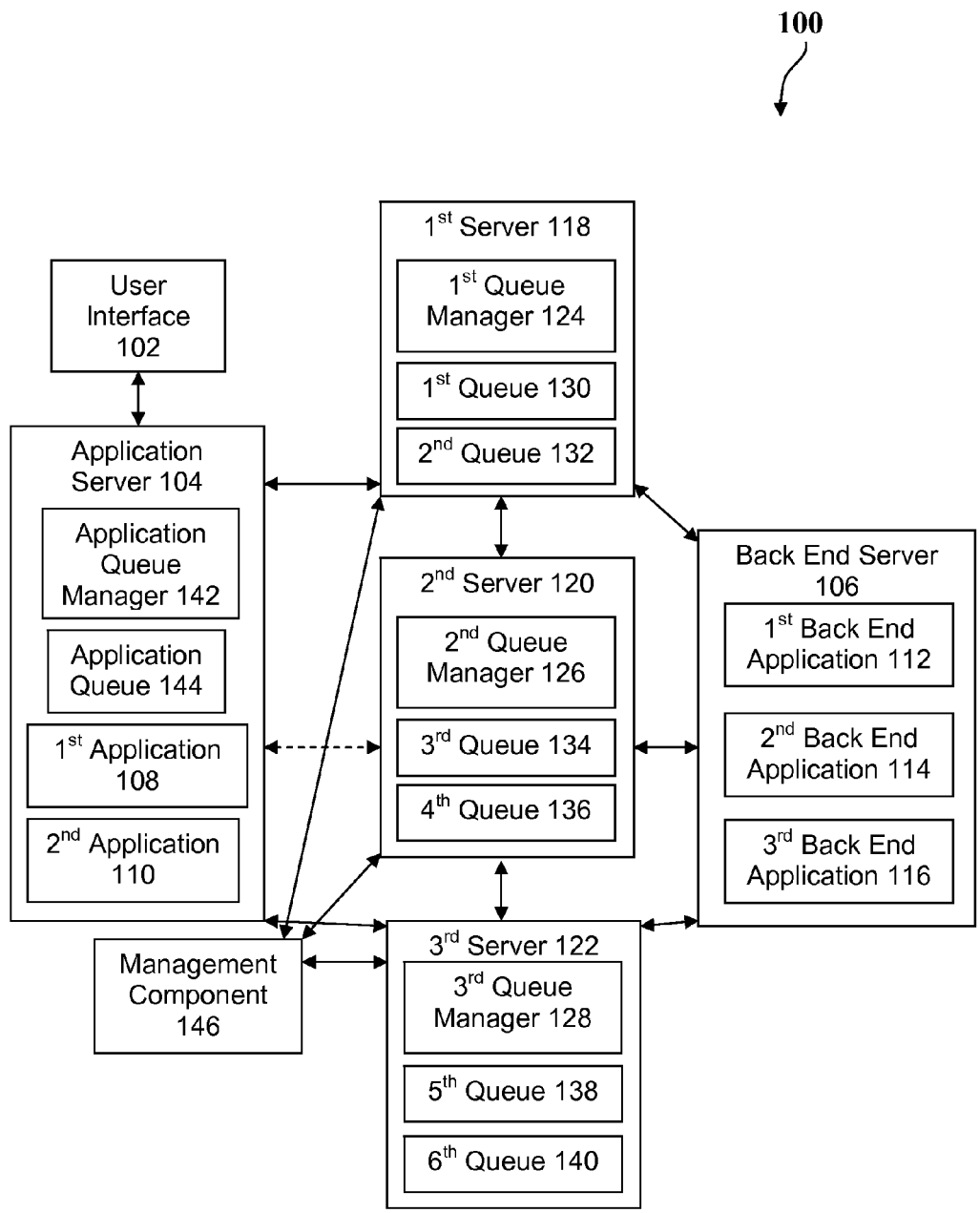
FIG. 1 is a block diagram of a system for managing message queue failure recovery according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A message queue system may be implemented using a message queue software, also known as a message-oriented middleware, and may be located in a network or data center component, such as at a server or other computer hardware component (e.g., a network interface card (NIC)). The message queue system may comprise one or more message queues that store a plurality of messages, and may be managed by a queue manager application. A message queue may be an object, e.g., a software based data structure in a memory component, that stores the messages. The message queue may store the messages prior to delivering or transmitting the messages to a receiving component or after receiving the messages from a transmitting component in a network or data center. The messages may comprise collections of binary or character data, e.g., American Standard Code for Information Interchange (ASCII) or Extended Binary Coded Decimal Interchange Code (EBCDIC) characters. The data may be interpreted by an application or program and/or used by hardware to implement a function. The messages may also comprise communications protocols, storage, routing, and/or delivery information, which may be added to the messages before transmission and removed from the messages after receiving the messages or prior to delivering the messages to a receiving application.

One aspect of the message queue system may promote recovery from system failure, such as software, hardware, or network failures. Typically, a message system may handle system failure recovery using a pre-define or pre-determine recovery scheme. Accordingly, the message system may be pre-configured, e.g., using a computer code or script, to restart or shut down (turn off) upon detecting a system failure affecting the message queue. In some message queue systems, the recovery scheme may be reconfigured off-line if needed or multiple recovery schemes may be used for different message queues or components. Such recovery schemes are static, since the schemes may not account for different failure scenarios or situations, and thus may cause in some cases unnecessary long delays for system restart or recovery, which may reduce overall system efficiency and robustness.

Disclosed herein is a system and methods for improving message queue system failure recovery. The system and methods may use a dynamic system recovery scheme, in the case of a failure affecting a message queue, which may depend on a detected state (in real-time) of the message queue at the time of the system failure event. The dynamic system recovery scheme may also depend on a monitored history of the message queue, such as using an active log and a recovery log for the message queue. The history of the message queue may comprise relevant backup and recovery information and may also indicate previous states of the message queue, e.g., up to the failure event. The dynamic system recovery scheme may select one of a plurality of available recovery procedures that may be appropriate for adapting to the detected current state and the monitored history of the message queue, at the time of the failure. Selecting an appropriate recovery procedure that is adapted to the state and history of the message queue may avoid unnecessarily long delays, and hence reduce the required time for system restart or recovery. Additionally, the system and methods may include using a plurality of message queues, e.g., during the recovery process, to improve load balancing between multiple queues.

In an embodiment, the system periodically evaluates the system status and history and determines a preferred recovery scheme that is maintained until the next evaluation interval. Then in the event of a failure the currently determined preferred recovery scheme is executed. This process of iteratively reevaluating the preferred recovery action may promote more rapid response when an actual failure occurs.

For instance, when the message queue becomes non-responsive while the queue manager is still responsive and the active log and message recovery log indicate persistent messages in the message queue, a first recovery procedure may be selected to restart the queue manager and reload one or more messages in the queue manager from a backup queue. This procedure may provide relatively fast recovery, e.g., at the software level, without substantially interrupting operations since the server that hosts the message queue and queue manger may not be substantially interrupted. However, although the message queue and queue manager may be recovered, the cause of the failure may not be completely resolved since the failure may be related to hardware issues (e.g., memory or storage medium failure). In another scenario, when both the message queue and the queue manager become non-responsive and the active log and message recovery log indicate a relatively recent previous restart of the message queue manager, a second recovery procedure may be selected to shut down and restart the hosting server. This procedure may have relatively slower recovery time than the first recovery procedure since the server's operations may be interrupted. However, the second recovery procedure may be more effective than the first recovery procedure in terms of resolving the cause of the failure. In yet another scenario, when the difference between the active log and the recovery log exceeds a determined quantity of logs, which may indicate a persistent issue, a third recovery procedure may be implemented to shut down the hosting server and signal a request for further investigation into the failure. This procedure may completely stop the operations of the server but may be necessary to resolve more serious or persistent issues, such as hardware failures.

FIG. 1 is a block diagram that illustrates a system 100 for managing message queue failure recovery according to some embodiments of the present disclosure. The system 100 includes a user interface 102, an application server 104, and a back end server 106. The user interface 102 enables a user of the system 100 to view information requested from the back end server 106 via the application server 104 and/or to control execution of the application server 104. The application server 104 executes applications 108-110 that can request data from back end applications 112-116 executed by the back end server 106.

Messages, such as data request made by the applications 108-110, can travel through a cluster of servers 118-122 before reaching the back end applications 112-116. The cluster of servers 118-122 implement queue managers 124-128 and queues 130-140 that enable the applications 108-110 to communicate with the back end applications 112-116 by message queuing, such that a dedicated synchronous link between the applications 108-110 and the back end applications 112-116 is not required. The queues 130-140 may be for example, International Business Machines (IBM) Message Queuing (MQ) Series message queues, Java® Message Service (JMS) queues, or other message services queues known to one of ordinary skill in the art that may be employed.

The servers 104, 106, and 118-122 may be located at a plurality of network or data center component, such as network nodes, routers, or data center computer systems. The servers may comprise memory components that host the applications and associated objects or data structures, and processing components that process the applications and objects. Some servers may also be located on the same component, such as at least some of the servers 118-122. For example, the cluster of servers 118-122 may be a plurality of NICs in a server rack at a data center. The queue managers 142 and 124-128 may be applications hosted in the servers that manage the corresponding queues, also be hosted in the servers.

Each server in the cluster of servers 118-122 may include one or more of the queue managers 124-128 to determine whether messages received are intended for one of the server's queues or intended to be temporarily stored and subsequently forwarded to another server's queues. For example, a first server 118 includes a first queue manager 124, a second server 120 includes a second queue manager 126, and a third server 122 includes a third queue manager 128. Each of the queue managers 124-128 may manage a transmission queue and a local queue, an inbound queue and an outbound queue, or any other types of queues. For example, the first queue manager 124 may manage a first queue 130 and a second queue 132, the second queue manager 126 may manage a third queue 134 and a fourth queue 136, and the third queue manager 128 may manage a fifth queue 138 and a sixth queue 140. The queue managers 124-128 may be located separately on the servers 118-122, or any combination of the queue managers 124-128 may be located on any of the servers 118-122. Furthermore, the queues 130-140 may be located in separate pairs on the servers 118-122, in any combination on any of the servers 118-122, or on other servers which are not pictured.

The application server 104 has an application queue manager 142 that manages an application queue 144 and determines where a message will be initially sent to communicate with the back end applications 112-116. For example, the application queue manager 142 sends a first message from the application queue 144 for the first application 108 to the first queue 130, which may be referred to as the first transmission queue 130. The first queue manager 124 may evaluate messages received on the first transmission queue 130, and determines whether each message can be serviced locally by the second queue 132, which may be referred to as the first local queue 132, or needs to be forwarded to another queue. In this example, the first queue manager 124 takes the first message from the first transmission queue 130 and puts the first message on the first local queue 132, which makes the message directly available to the first back end application 112. Subsequently, the first back end application 112 may check the first local queue 132 for messages that can be serviced locally, and provide the data requested by the message. After the first back end application 112 provides the data requested by the message, the first queue manager 124 may transfer the message from the first local queue 132 back to the first transmission queue 130. The first transmission queue 130 may return the message with the requested data back to the application queue 144 for the first application 108.

In another example, the application queue manager 142 may send a second message from the application queue 144 for the second application 110 to the first transmission queue 130. If the first queue manager 124 determines that the message cannot be serviced locally by the first local queue 132, the first queue manager 124 may forward the message in the first transmission queue 130 to another queue. The first queue manager 124 may forward the message to a transmission queue associated with a local queue that directly services the message or to a transmission queue that forwards the message on to yet another transmission queue. The local queue that directly services the message may be referred to the destination queue for the message. Continuing this example, the first queue manager 124 may forward the message to the third queue 134, which may be referred to as the second transmission queue 134.

The second queue manager 126 evaluates messages received on the second transmission queue 134, and determines whether each message can be serviced locally by the fourth queue 136, which may be referred to as the second local queue 136, or needs to be forwarded to another transmission queue. If the second queue manager 126 determines that the message can be serviced locally by the second local queue 136, the second queue manager 126 transfers the message from the second transmission queue 134 to the second local queue 136. If the second local queue 136 is a queue that is serviced by the second back end application 114, the second local queue 136 may be the destination queue for the message. Subsequently, the second back end application 114 may check the second local queue 136 for messages that can be serviced locally, and provides the data requested by the message. After the second back end application 114 provides the data requested by the message, the second queue manager 126 may transfer the message with the data from the second local queue 136 back to the second transmission queue 134. The second transmission queue 134 then returns the message with the requested data back to the application queue 144 for the second application 110.

The application queue manager 142 may monitor the sequence in which the application queue manager 142 sends messages to the servers 118-122, and use this sequence to load balance and distribute the messages appropriately between the servers 118-122 over time. The application queue manager 142 may perform other functions well known to one skilled in the art. The system 100 also includes a recovery management component 146, which may be an application that manages message queue failure recovery in the system 100, e.g., due to software, hardware, or network failures. Although depicted as separate from the servers 104-106 and 118-122, the recovery management component 146 can be executed anywhere in the system 100. The numbers of user interfaces, management components, application servers, clustered servers, back end servers, queue managers, and queues in the system 100 are depicted in FIG. 1 for the purpose of an illustrative example, as the system 100 can include any number of user interfaces, management components, application servers, clustered servers, back end servers, queue managers, and queues. In some embodiments, an application server or a back end server may also comprise a queue manager and one or more corresponding queues.

The recovery management component 146 may monitor and detect a failure or problem for a queue or server, such as any of the queues in the servers 118-122, and implement an appropriate recovery procedure according to monitored information and detected problem or failure. The recovery management component 146 may also monitor and manage recovery for the queues in the servers 104 and 106. The recovery management component 146 may monitor the status of the queues and queue managers and maintain an active log for each monitored queue. The status of the queue and queue manager may indicate the current operation condition of the queue and the queue manager, such as active, idle, non-responsive, or other operation conditions. The status of the message queues may be maintained in a plurality of corresponding objects (values or variables) in memory. Similarly, the status of the queue managers may be maintained in corresponding objects in memory. The active log may indicate events information that may be needed for recovering the queue, the queue manager, and related message queue system software (or middleware) objects for operating the queue and queue manager. Such information may include the depth of the queue, i.e., the amount of data or messages in the queue, and the status history of the queue and queue manager. The active log for each queue may have a limited size and the information in the log may be recycled or replaced by more recent information when the limit is reached. The old or replaced information in the active log may be transferred to an archive log to maintain older history information for the queue. The active logs for the message queues and the archive logs may be maintained in corresponding files that may be stored in a storage medium, such as a hard disk or other suitable storage media.

The recovery management component 146 may also maintain a message recovery log for one or multiple queues and queue managers. The message recovery log may indicate errors, failures, or problems and corresponding recovery procedures for the queues, queue managers, and components or other system resources associated with the queue. The message recovery log may hold error and recovery information from the last time of starting or recovering the queue. Information prior to recovering the queue may be recorded in a previously dated message recovery log. The information in the recovery log may be compared to the information in the active log to reload messages in the queue at recovery and verify that the data in the queue is correct. Similar to the active log, the message recovery log may be maintained in a file that may be stored in a storage medium, e.g., with the active log file.

In some embodiments, the recovery management component 146 may maintain a message recovery log file that records a plurality of problem identifiers (IDs) specifying a plurality of problems for software and hardware components. For example, the message recovery log may be a First-Failure Support Technology (FFST) log file used in IBM WebSphere MQ platform, where the first about 6 or 8 fields of the problem IDs represent prefixes that identify message queue (software) components with problems. The recovery management component 146 may monitor in real-time the status of the queue and queue manager on a continuous basis, periodically, or upon receiving status information from the queues, queue managers, or servers. Similarly, the active log and message recovery log may be updated in real-time on a continuous basis or periodically.

Examples of problems or failures detected by the recovery management component 146 include loss of communications with or between queues and/or servers, relatively long delays or responses from queues and/or servers, message losses, unexpected idle queues or servers, or other detected software, hardware, or networking problems or failures in the queues or servers. The problem or failure may be associated with one or many of the queues in the servers 118-122 and the remaining servers. For example, when one or both of the queues 130-132 stop queuing (or storing) incoming messages, such as due to hardware memory failure, the recovery management component 146 may detect a problem for all of the queues 130-132 in the server 118.

Upon detecting a problem in a queue or server for one or more queues, the recovery management component 146 may examine the current status of the queue and queue manager and the active/recovery logs to determine an appropriate recovery procedure for the problem. The recovery procedure may be selected from a plurality of pre-configured procedures, based on the queue and queue manager status and active/recovery logs. For instance, the recovery management component 146 may use the status and logs information with decision tree logic to select the recovery procedure. Upon detecting a problem or failure, the recovery management component 146 may also detect current status of resources (e.g., for hardware or networking components) associated with the queue to make the recovery decision. For example, the recovery management component 146 may detect the current status of the queue and queue manager and the current conditions of the memory and processing components of the server, e.g., memory and central processing unit (CPU) utilization statistics to make the recovery decision.

In one exemplary scenario, if the status indicates a non-responsive queue but a responsive queue manager and the active/recovery logs indicate persistent messages in the queue, then the recovery management component 146 may initiate a first recovery procedure (a software recovery procedure) that restarts the queue manager and reloads messages in the queue from a backup queue. Alternatively, if the status indicates multiple non-responsive queues at the same server or a non-responsive queue manager, and the active/recovery logs indicate a relatively recent previous restart of the queue manager, then the recovery management component 146 may initiate a second fail-over recovery procedure (a hardware recovery procedure) that shuts down and restarts the server of the queue. If the difference between the active and recovery logs exceeds a determined quantity (e.g., about 5 logs), then the recovery management component 146 may shut down the server and signal a request for further investigation into the matter. Other recovery procedures may also be implemented according to different combinations of detected current queue and queue manager status, active/recovery logs information, and other detected or monitored system resource conditions.

The recovery procedure selected according to the status and logs information may be implemented using a corresponding script or code or a link to the script, also referred to as a symbolic link. For example, the decision tree logic may be used to select one appropriate script or routine from a plurality of available routines. The tree logic may be a script or software that includes decision instructions to determine an appropriate recovery procedure, as described above. A symbolic link may be configured, e.g., dynamically within the tree logic instructions, to call the selected routine. The symbolic link (also referred to as a soft link) may be a type of file that contains a reference to another file or directory in the form of an absolute or relative path. A symbolic link typically contains a text string that is interpreted and followed by the operating system as a path to another file or directory. The other file or directory may comprise one or more recovery routines.

The symbolic link may be configured or adjusted based on the tree logic decision to point to the selected recovery routine, such as in a library of available routines. Using a configurable (dynamic) symbolic link with the tree logic to point to a selected routine instead of having one or more routine codes or scripts for recovery procedure embedded directly into the tree logic script may allow for more flexibility to replace or modify at least some of the routines or library, if needed, without substantially changing the tree logic script or software.

In some embodiments, the recovery management component 146 may detect, in the case of failure, the current status of a plurality of message queues and queue managers that belong to the same server or multiple servers in the system 100. The recovery management component 146 may also analyze, with the detected status information, a plurality of active/recovery logs for the message queues and queue managers and optionally a plurality of associated current resource conditions to determine a suitable recovery procedure. Additionally, the recovery management component 146 may redistribute the data (e.g., messages) in the message queues (at the same or different servers), such as to achieve load balancing between the message queues or servers according to the analyzed information. For example, some of the messages may be reloaded in the recovered message queue or reassigned to the recovered queue manager, while the remaining messages may be assigned to other message queues and queue managers. This may improve failure recovery where redistributing the messages across different message queues or servers may anticipate and account for any future similar failures. The recovery management component 146 may instruct or communicate with the queue managers to achieve a desired load balancing between the queues or servers.

Using the recovery selection procedure described above based on the detected queue and queue manager current status, the monitored active and recovery logs, and optionally other monitored system conditions and resources may allow for a dynamic and more flexible message queue system recovery, which may save recovery time and improve overall system efficiency and robustness. This dynamic system recovery scheme may take advantage of the current system circumstances that cause the message queue or manager failure, as opposed to prior static recovery schemes that may be based on expected rather than actual system circumstances to handle failure recovery. The dynamic system recovery scheme depends on actual status and history log information for the queue and queue manager. Thus, the selected recovery procedure may be different depending on different circumstances and more suitable to the current situation and history of the system. This dynamic recovery scheme may also be more effective in solving the underlying problem that caused the failure, for example at a first attempt or at fewer attempts, in comparison to other static schemes.

Figure 2:
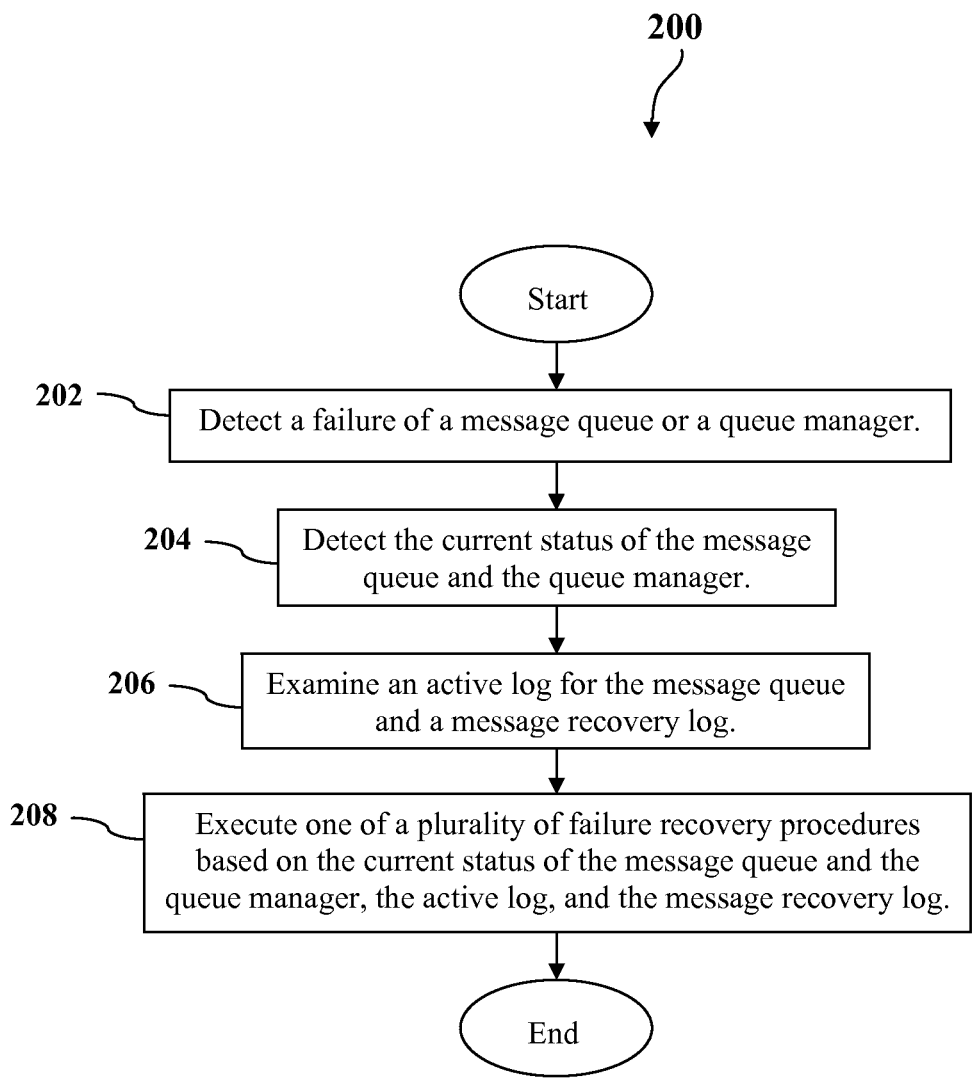
FIG. 2 is a flow chart of a method for managing message queue failure recovery according to an embodiment of the disclosure.

FIG. 2 is a flowchart that illustrates a method 200 for managing message queue failure recovery according to embodiments of the present disclosure. Executing the method 200 enables recovery of message queues and queue managers in the case of failures in a dynamic manner to reduce recovery time and improve system robustness and efficiency. For example, the method 200 may be implemented by the recovery management component 146 or any other software and/or hardware component in the system 100.

In box 202, a failure of a message queue or a queue manager may be detected. For example, communications may be lost between the recovery management component 146 and the queue manager or the corresponding server. Alternatively, the messages received in a queue may be lost or may not be loaded from memory to complete delivery. In another example, an error signal may be received from the server or the queue manager indicating that a queue operation, such as a read or write operation, has failed.

In box 204, the current status of the message queue and the queue manager may be detected. For example, upon detecting the failure (e.g., receiving an error signal), the recovery manager component 146 may check the current status of each of the corresponding queue and queue manager. The detected status may indicate one of active, busy, idle, non-responsive, or other possible operating states.

In box 206, an active log for the message queue and a message recovery log may be examined. For example, the amount of data or quantity of messages in the queue may be obtained from the active queue and information about prior errors, conditions, and time/date may be obtained from the message recovery log.

In box 208, one of a plurality of failure recovery procedures may be executed based on the current status of the message queue and the queue manager, the active log, and the message recovery log. For example, a first recovery procedure or routine may be implemented to reinitiate the queue object in memory when the monitored information indicates a software error in the message queue system. A second recovery procedure or routine may be implemented to restart the server of the message queue and queue manager when the monitored information indicates a communication error in the message queue system. Alternatively, a third recovery procedure or routine may be implemented to shut down the server and use a backup server instead when the monitored information indicates a hardware error in the message queue system.

Figure 3:
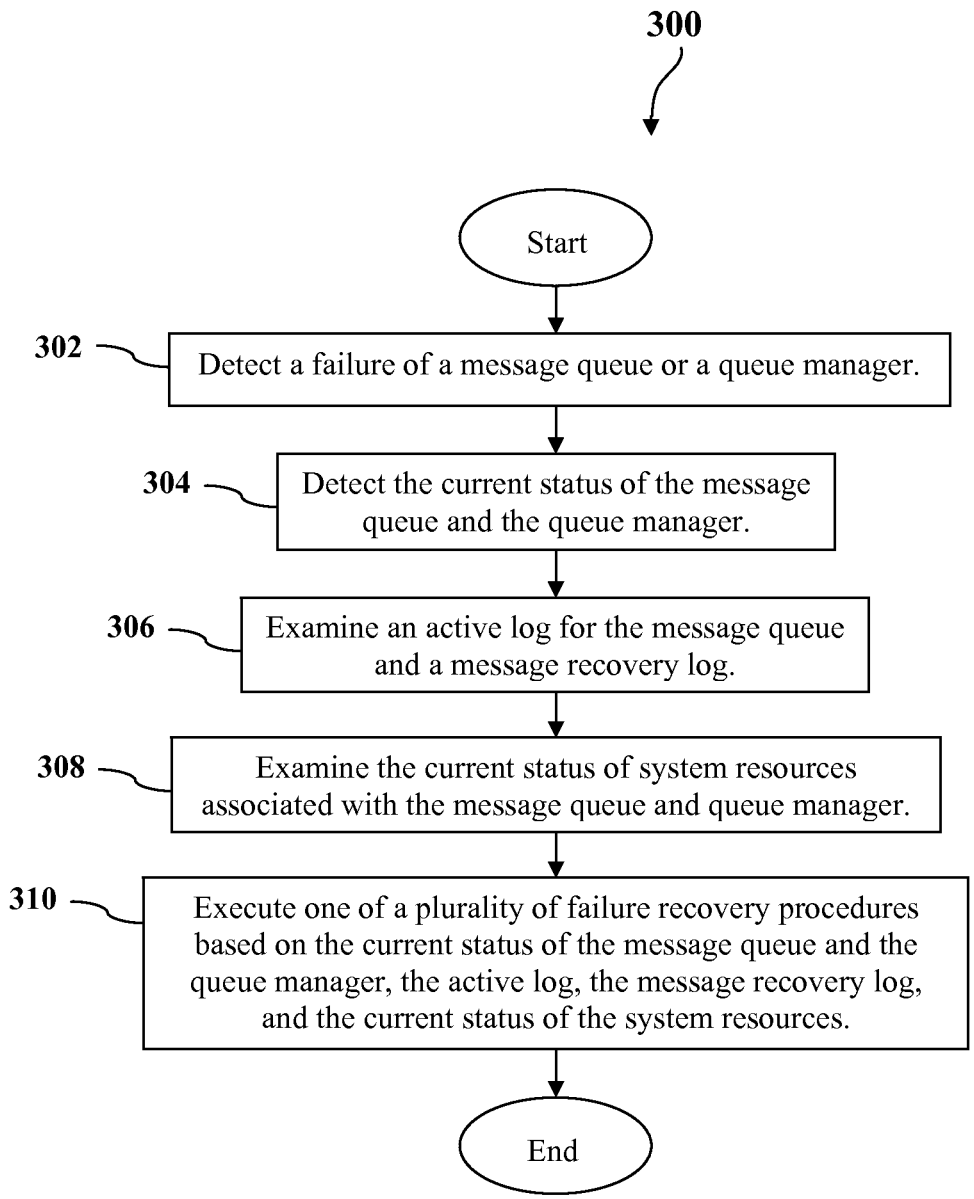
FIG. 3 is a flow chart of another method for managing message queue failure recovery according to an embodiment of the disclosure.

FIG. 3 is a flowchart that illustrates another method 300 for managing message queue failure recovery according to embodiments of the present disclosure. The method 300 may be executed to enable message queue or queue manager recovery, after a system failure, in a dynamic manner to reduce recovery time and improve system robustness and efficiency. For example, the method 300 may be implemented by the recovery management component 146 or any other software and/or hardware component in the system 100.

In box 302, a failure of a message queue or a queue manager may be detected. This step may be similar to the step in box 202 above.

In box 304, the current status of the message queue and the queue manager may be detected. This step may be similar to the step in box 204 above.

In box 306, an active log for the message queue and a message recovery log may be examined. This step may be similar to the step in box 206 above.

In box 308, the current status of system resources associated with the message queue and queue manager may be examined. Examining the current status of system resources (at the time of the failure) in addition to the status and log information may provide more in-depth analysis of the circumstances that led to the failure. This may provide a better prediction of the cause(s) of the failure and hence selecting a more suitable recovery procedure, which may further improve system robustness. For example, the server memory and processing components usage may be examined in addition to the status of the message queue and queue manager and the active/error logs. Other system resources that may be examined include other system working conditions, such as for a plurality of other servers or applications in communications with the queue manager and message queue. This step may also increase the response delay time for recovery and may be implemented conditionally, such as depending on the status and logs analysis.

In box 310, one of a plurality of failure recovery procedures may be executed based on the current status of the message queue and the queue manager, the active log, the message recovery log, and the current status of the system resources. This step may be similar to the step in box 208 above, but may also include the analysis status of the system resources to select the appropriate routine.

Figure 4:
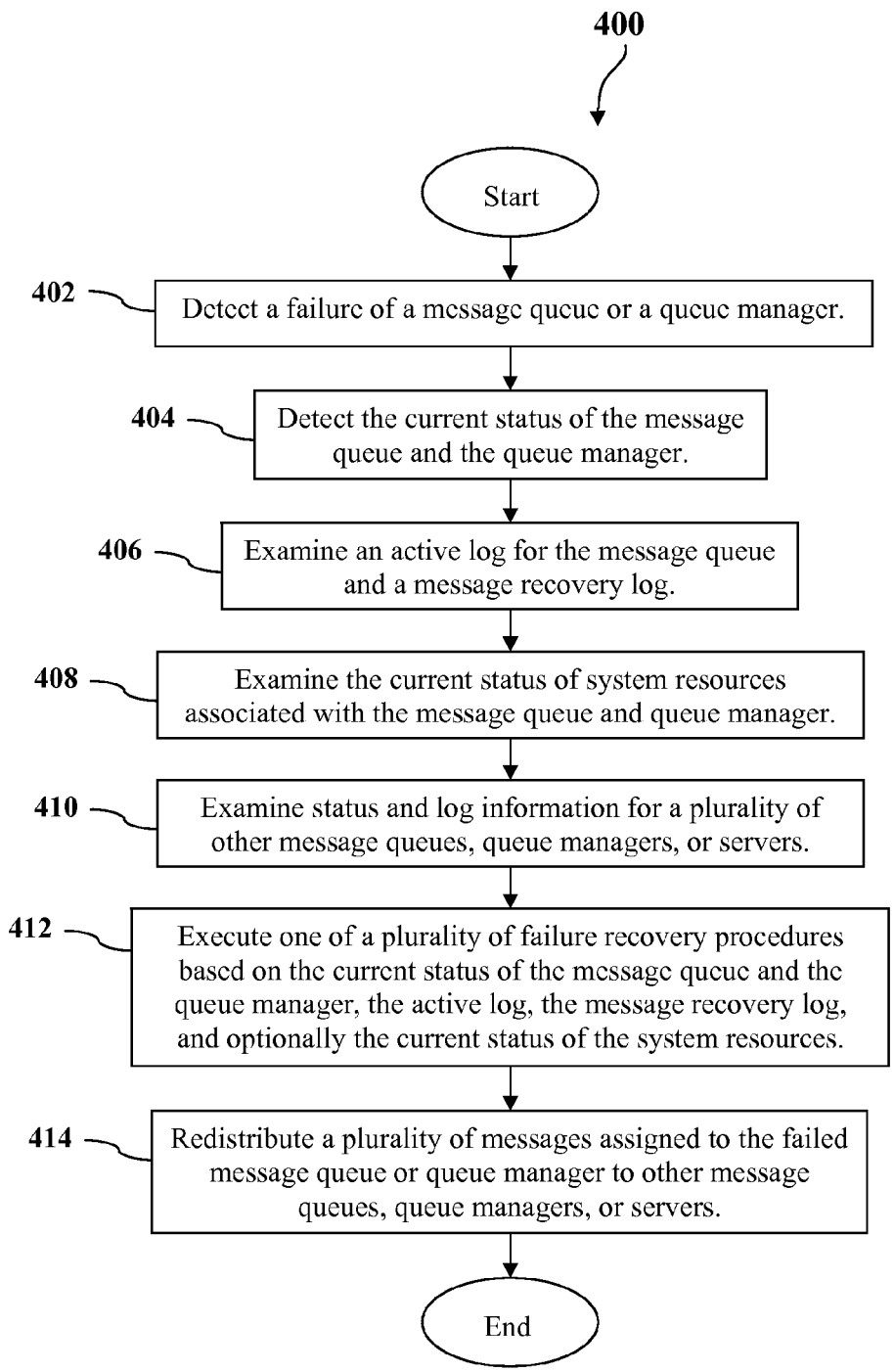
FIG. 4 is a flow chart of another method for managing message queue failure recovery according to an embodiment of the disclosure.

FIG. 4 is a flowchart that illustrates another method 400 for managing message queue failure recovery according to embodiments of the present disclosure. The method 400 may be implemented by the recovery management component 146 or any other software and/or hardware component in the system 100 to enable dynamic message queue or queue manager recovery, which reduces recovery time and improve system robustness and efficiency.

In box 402, a failure of a message queue or a queue manager may be detected. This step may be similar to the step in box 202 above.

In box 404, the current status of the message queue and the queue manager may be detected. This step may be similar to the step in box 204 above.

In box 406, an active log for the message queue and a message recovery log may be examined. This step may be similar to the step in box 206 above.

In box 408, the current status of system resources associated with the message queue and queue manager may be examined. This step may be similar to the step 208 above and may be implemented conditionally, such as depending on the status and logs analysis. In another embodiment, this step may be optional and may be removed from the method 400.

In box 410, status and log information for a plurality of other message queues, queue managers, or servers may be examined. The status and log information for these multiple system components may be examined and analyze in a manner similar to the steps above.

In box 412, one of a plurality of failure recovery procedures may be executed based on the current status of the message queue and the queue manager, the active log, the message recovery log, and optionally the current status of the system resources. This step may be similar to the step in box 310 above.

In box 414, a plurality of messages assigned to the failed message queue or queue manager may be redistributed to other message queues, queue managers, or servers. The messages may be redistributed based on the analysis of the data above to account for and prevent future failures in the recovered message queue or queue manager and to improve overall load balancing in the message queue system. Improving the load balancing in the system may also improve the system robustness or resilience to future failures.

Figure 5:
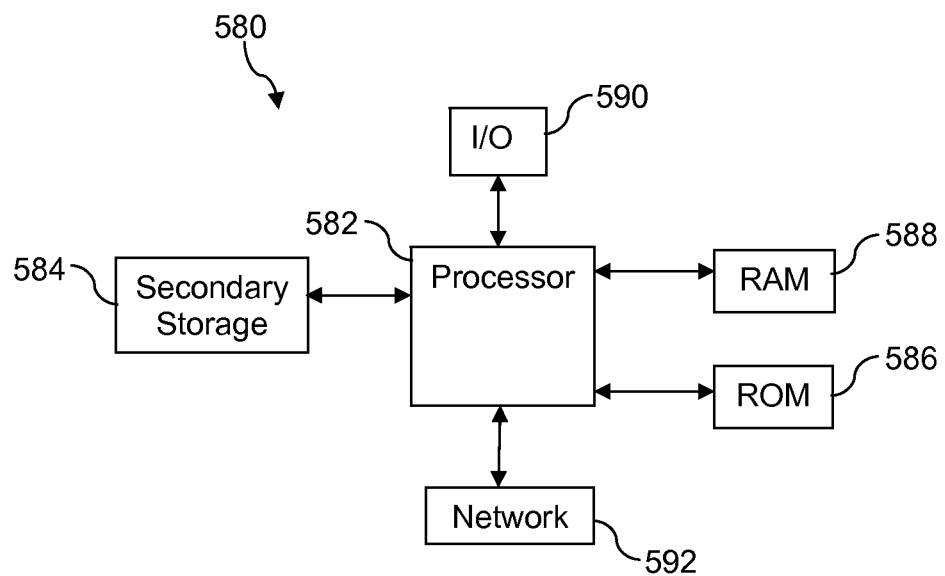
FIG. 5 illustrates an exemplary purpose computer system suitable for implementing the several embodiments of the disclosure.

FIG. 5 illustrates a computer system 580 suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation.

Often a design may be developed and tested in a software form and later transformed, by known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for message queue failure recovery, comprising:
   a non-transitory computer readable storage medium comprising a recovery management component stored as a set of computer instructions that, when executed by a processor, cause the processor to:
   detect a failure in a message queue or a queue manager for the message queue,
   iteratively detect a current status of each of the message queue and the queue manager,
   iteratively examine a maintained active log for the message queue and a message recovery log,
   iteratively select one of a plurality of failure recovery procedures based at least on the iteratively detected current status of the message queue and the queue manager, the maintained active log, and the message recovery log, wherein the plurality of failure recovery procedures comprise:
   a first procedure to restart the queue manager and reload one or more messages in the queue manager from a backup queue,
   a second procedure to shut down and restart a server that hosts the message queue and the queue manager, and
   a third procedure to shut down a server that hosts the message queue and the queue manager and signal a request for further investigation into the failure, and
   responsive to detecting the failure, execute the currently selected one of the plurality of failure recovery procedures.

2. The system of claim 1, wherein the failure is caused by a software error, a hardware error, or a communication error.

3. The system of claim 1, wherein the current status of the message queue, the queue manager, or both is one of active, busy, idle, and non-responsive.

4. The system of claim 1, wherein the maintained active log indicates information for recovering the message queue, the queue manager, and related objects.

5. The system of claim 1, wherein the maintained active log indicates the message queue's depth.

6. The system of claim 1, wherein the message recovery log comprises a plurality of problem identifiers (IDs) specifying identifying a plurality of message queue components with problems.

7. The system of claim 1, wherein at least one of the plurality of failure recovery procedures is executed using a configurable symbolic link that points to a selected executable routine.

8. The system of claim 1, wherein the message queue and the queue manager application are hosted in a memory component of a server that is coupled to a plurality of other servers in a data center or a network, and wherein at least some of the plurality of other servers comprise a plurality of other message queues and other queue managers in communications with the message queue and the queue manager.

9. The system of claim 1, wherein the current status of each of the message queue and the queue manager is maintained and updated in a corresponding object in a computer memory component, and wherein the active log and the message recovery log are maintained in corresponding files in a non-transitory computer readable storage medium.

10. The system of claim 1, wherein the failure is detected subsequent to the iterative detection, the iterative examination, and the iterative selection.

11. A computer implemented method for message queue failure recovery, comprising:
    detecting, by a processor, a failure in a message queue or a queue manager for the message queue;
    detecting, by a processor, a current status of each of the message queue and the queue manager;
    examining, by a processor, a maintained active log for the message queue and a message recovery log;
    examining, by a processor, usage of system resources associated with the message queue and the queue manager; and
    executing one of a plurality of failure recovery procedures based on the current status of the message queue and the queue manager, the maintained active log, the message recovery log, and the usage of the system resources, wherein responsive to a difference between the maintained active log and the recovery log exceeding a determined quantity of logs, the executed failure recovery procedure shuts down a server that hosts the message queue and the queue manager and signals a request for investigation of the failure.

12. The computer implemented method of claim 11, wherein responsive to the current status of the message queue indicating a non-responsive queue, the current status of the queue manager indicating a responsive queue manager, and the maintained active log and message recovery log indicating persistent messages in the message queue, the executed failure recovery procedure at least restarts the queue manager and reloads one or more messages in the queue manager from a backup queue.

13. The computer implemented method of claim 11, wherein responsive to the current status of each of the message queue and the queue manager being non-responsive and the maintained active log and message recovery log indicating a previous restart of the message queue manager within a pre-defined time interval, the failure recovery procedure executed shuts down and restarts a server that hosts the message queue and the queue manager.

14. The computer implemented method of claim 11, wherein the current status for each of the message queue and the queue manager, the maintained active log, the message recovery log, and the usage of system resources are analyzed using a processor executing decision tree logic to select at least one of a plurality of pre-determined routines for a message queue recovery.

15. The computer implemented method of claim 11, wherein the system resources include memory and central processing unit utilization statistics.

16. A system for message queue failure recovery, comprising:
- a non-transitory computer readable storage medium comprising a recovery management component stored as a set of computer instructions that, when executed by a processor, cause the processor to:
  - detect a failure in a message queue or a queue manager for the message queue,
  - iteratively detect a current status of each of the message queue and the queue manager,
  - iteratively examine a maintained active log for the message queue and a message recovery log,
  - examine status and log information for a plurality of other message queues and queue managers for the other message queues,
  - iteratively select at least one of a plurality of failure recovery procedures based at least on the iteratively detected current status of the message queue and the queue manager, the maintained active log, and the message recovery log,
  - responsive to detecting the failure, execute the currently selected at least one of the plurality of failure recovery procedures based at least on the iteratively detected current status of the message queue and the queue manager, the maintained active log, and the message recovery log, and
  - redistribute a plurality of messages previously assigned to the failed message queue or queue manager to the other message queues or the queue managers of the other message queues based on the respective status and log information for the message queues and queue managers for the other message queues.

17. The system of claim 16, wherein at least one of the messages previously assigned to the failed message queue or queue manager is reassigned to the same message queue after recovery.

18. The system of claim 16, wherein the messages previously assigned to the failed message queue or queue manager are reassigned to the other message queues or the queue managers of the other message queues in a manner to achieve load balancing between all active message queues and queue managers.

19. The system of claim 16, wherein the messages previously assigned to the failed message queue or queue manager are also redistributed to the other message queues or the queue managers of the other message queues based on the current status of each of the message queue and the queue manager, the maintained active log, and the message recovery log.

20. The system of claim 19, wherein the recovery management component further examines usage of system resources associated with the message queue, the queue manager, the other message queues, and the queue managers of the other message queues, and wherein the messages previously assigned to the failed message queue or queue manager are also redistributed to the other message queues or the queue managers of the other message queues based on the usage of system resources.

* * * * *